United States Patent
Lutz

(10) Patent No.: US 6,500,495 B2
(45) Date of Patent: Dec. 31, 2002

(54) METHOD FOR CURING REACTIVE INK ON GAME BALLS

(75) Inventor: Mitchell E. Lutz, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/840,118

(22) Filed: Apr. 24, 2001

(65) Prior Publication Data

US 2002/0009553 A1 Jan. 24, 2002

Related U.S. Application Data

(63) Continuation-in-part of application No. 09/009,720, filed on Jan. 20, 1998, now Pat. No. 6,248,804, which is a continuation-in-part of application No. 08/807,502, filed on Feb. 27, 1997, now Pat. No. 6,013,330.

(51) Int. Cl.$^7$ .................................................. C08J 7/18
(52) U.S. Cl. .............. 427/500; 427/385.5; 427/393.5; 427/407.1; 427/412.1; 427/505; 427/514; 427/516; 427/551; 427/553; 427/558; 427/559
(58) Field of Search ................................ 427/496, 500, 427/505, 514, 516, 551, 553, 558, 559, 385.5, 393.5, 407.1, 412.1

(56) References Cited

U.S. PATENT DOCUMENTS

| | | | | |
|---|---|---|---|---|
| 4,276,479 A | * | 6/1981 | Mibu et al. .............. 250/492 R |
| 4,670,295 A | | 6/1987 | Quinn et al. ............... 427/54.1 |
| 4,680,368 A | | 7/1987 | Nakamoto et al. ............ 528/49 |
| 4,745,857 A | | 5/1988 | Putnam et al. ................ 101/44 |
| 4,803,922 A | | 2/1989 | Dennesen .................... 101/41 |
| 4,896,598 A | | 1/1990 | Leech, Jr. ................... 101/170 |
| 5,237,922 A | | 8/1993 | Ho .............................. 101/333 |
| 5,395,862 A | | 3/1995 | Neckers et al. ................ 522/25 |
| 5,451,343 A | | 9/1995 | Neckers et al. .............. 252/582 |
| 5,461,109 A | * | 10/1995 | Blair et al. .................. 524/839 |
| 5,513,567 A | | 5/1996 | Froh et al. ................... 101/170 |
| 5,668,614 A | * | 9/1997 | Chien et al. ................. 349/115 |
| 5,669,831 A | * | 9/1997 | Lutz ............................ 473/377 |
| 5,770,325 A | | 6/1998 | Keller et al. ................. 428/914 |
| 5,785,612 A | | 7/1998 | Shapiro et al. ............. 473/377 |
| 5,827,134 A | | 10/1998 | Sullivan et al. ............. 473/372 |
| 5,885,173 A | * | 3/1999 | Keller ......................... 473/385 |
| 5,968,605 A | | 10/1999 | Lutz ............................ 427/500 |
| 6,001,898 A | | 12/1999 | Lutz ............................ 523/160 |
| 6,013,330 A | | 1/2000 | Lutz ............................ 427/511 |
| 6,188,075 B1 | * | 2/2001 | Takayama et al. ........ 250/492.3 |

FOREIGN PATENT DOCUMENTS

| | | |
|---|---|---|
| JP | 60025756 A | 2/1985 |
| JP | 60056555 A | 4/1985 |
| JP | 60141584 A | 7/1985 |
| JP | 2106349 A | 4/1990 |
| JP | 2107444 A | 4/1990 |
| JP | 7126565 A | 5/1995 |

\* cited by examiner

*Primary Examiner*—Bernard Pianalto
(74) *Attorney, Agent, or Firm*—Swidler Berlin Shereff Friedman, LLP

(57) ABSTRACT

This invention is directed to a method for forming an inked image on game balls, golf balls, and the like, through the use of novel curable inks that are low energy curable and require minimal curing through multiple source radiation curing processes, such as UV radiation, visible radiation, and electron beam radiation. Production inks, logo inks, and methods for forming production prints and logos on golf balls, game balls, and the like are disclosed.

27 Claims, No Drawings

METHOD FOR CURING REACTIVE INK ON GAME BALLS

CROSS-REFERENCE TO RELATED APPLICATIONS

This is a continuation-in-part of application Ser. No. 09/009,720 filed Jan. 20, 1998, U.S. pat. No. 6,248,804 which is a continuation-in-part of application Ser. No. 08/807,502 filed Feb. 27, 1997, which issued as U.S. Pat. No. 6,013,330 on Jan. 11, 2000.

FIELD OF THE INVENTION

The present invention is directed to a process of curing radiation curable inks applied to curved surfaces including spherical surfaces with ultraviolet (UV) and/or visible light and curing with electron beam. More particularly, the invention is directed to a combination of UV light and/or visible light and electron beam curing of radiation curable inks and their application to and curing upon game balls, golf balls and the like. These inks are preferentially applied as single or multiple, clear or color layers for forming logos or production prints on game balls including golf balls.

BACKGROUND OF THE INVENTION

It is often desirable to apply clear, pigmented or dyed ink coatings or layers to form distinctive logos or production prints on game balls (e.g., golf balls, ping pong balls, billiard balls, baseballs, basketballs, racquet balls, handballs, etc.). Various commercially available inks are commonly used for this purpose.

To clarify the difference between logo printing and production printing, a brief description of these processes as they are applied to game balls such as golf balls (e.g., having curved surfaces) is provided below. Golf balls are commonly one-piece, two-piece or three-piece constructions. One-piece balls are made from a homogeneous polymer shaped into a golf ball. Two-piece golf balls comprise an inner core and an outer surrounding polymeric shell. Three-piece golf balls comprise various combinations of a core (wound or unwound), one or more intermediate polymeric shells and an outer polymeric cover. The cover polymer used in two-piece and three-piece balls may, for example, be balata, an ionomeric polymer (e.g., SURLYN®) or a polyurethane.

Golf ball covers are commonly painted with a primer coat which may be colored (e.g., white) or transparent. Alternately, the cover itself may contain a colorant. Typically, a tough, often glossy, topcoat is applied over the cover and/or the primer coat to form a protective outer seal on the golf ball. The topcoat may comprise, for example, a two component urethane. The topcoat typically increases the shine (i.e., glossy appearance) of the golf ball to enhance or brighten its appearance.

As used herein, "production printing" is when ink is applied directly to the cover or to the primer coat and the ink is then further coated with a topcoat. The image produced thereby is a "production" print and the ink used for this purpose is a "production" ink. In production printing, for some applications, when ink is applied directly to a cover, the cover surface is first roughened, for example, by sandblasting to enhance the bond between the ink and the cover. Thereafter, the ink is applied to the roughened cover. A transparent water based or solvent based overcoat may be applied over the ink layer and on the roughened cover to smooth out the cover and ink surfaces. Examples of such overcoats include urethane, polyester and acrylic. Thereafter, a topcoat is preferably applied to the overcoat.

Alternatively, "logo printing" as also used herein, involves the application of the ink directly onto a topcoat. The image produced thereby is a "logo" and the ink is a logo (or custom) ink. Thus, by use of production and/or logo printing one may add decorative markings such as a company trademark, symbol or the like to increase brand recognition and/or to enhance the appearance and/or the visibility of golf balls, game balls and the like. Logo prints therefore adhere to the typically glassy exterior of a topcoat, and have no other protective coating affixed thereto.

Inks used in production and logo printing must have sufficient durability. Durability is influenced by such factors as ink layer flexibility (i.e., ink layer brittleness), ink layer resistance to abrasion, ink migration due to gravity, ink layer hardness, adhesion to golf ball cover polymers such as ionomers (e.g., SURLYN®), balata, polyurethane, polyolefin and mixtures thereof, adhesion to topcoats, adhesion to primer coats and intercoat adhesion between various layers of inks and/or other overcoats and/or topcoats.

Most commonly, logos and production prints are applied to golf balls by a pad printing process and apparatus. Pad printing uses an etched image plate (i.e., a cliche) having an etching of the desired image. The image plate, typically, is made of a tough material such as metal, steel, other alloy or photopolymer which normally has a uniform thickness except for the area defining the etched image. The plate may optionally be coated with one or more protectant layers or materials, to enhance its useful life. Typically the depth of the etched image is from about 5 microns to about 30 microns.

During pad printing, ink is applied to the image plate, thus filling the etched image. Excess ink is then scraped off of the image plate, leaving behind ink only within the etched image. A printing pad is then momentarily lowered and pressed onto the inked image plate to lift ink off of the etched ink filled cavity onto the printing pad. The ink so lifted defines the shape of the etched image. The inked pad is then momentarily lowered and pressed onto, for example, a golf ball, thereby releasing the ink from the pad to the golf ball. The ink released from the pad forms, on the spherical surface of the ball, an image corresponding to that of the etched cavity.

This process of inking the image plate, scraping off excess ink, lifting off ink onto the printing pad and releasing the ink from the pad to the object (e.g., golf ball) to be inked may be repeated to print a plurality of images on a plurality of types of balls with various inks having desirable ink properties. The process of pad printing is well known. See, for example, U.S. Pat. Nos. 5,513,567 (Froh et al.); 4,896,598 (Leech, Jr.); 4,803,922 (Denesen); 4,745,857 (Putnam et al.); and 5,237,922 (Ho).

Printing pads are made from a resilient material such as silicone rubber which desirably picks up ink from the etched cavity of the image plate during lift-off and releases all of the ink lifted off when brought into contact with the article to be printed. Once the ink is deposited, it is cured, most commonly by a thermal curing process.

However, during manufacturing of printed articles such as game balls and golf balls, ink transfer problems are often encountered. For example, while it is desirable that all of the ink picked up by the printing pad be fully released onto the article to be printed, sometimes complete release is not achieved. Consequently, subsequent articles to be printed upon by the same printing pad member may have excessive ink or misaligned ink deposited thereon. Such improper ink deposition leads to unwanted ink contamination of balls, either directly between balls or indirectly by first transferring ink to ball handling equipment or both. Resolution of such problems requires expensive positioning equipment to prevent unwanted contact between balls, between ink depositing members and balls and between ball handling equipment and balls, respectively.

To overcome such ink transfer problems, intermediate thermal curing steps are introduced into the manufacturing process. There are several disadvantages to thermal curing, however. These include (1) high energy consumption, (2) long cooling cycles, (3) restricted material selection to thermally curable and thermally stable polymeric materials and (4) use of costly ventilating systems to dissipate vapors generated during thermal curing.

In addition to the problems associated with ink transfer before the ink is cured, post manufacturing problems are also commonly encountered even after curing takes place. Ink layers, after cure, may not possess a desirable level of adhesion to a substrate article surface. For example, a logo printed onto a golf ball topcoat is subjected to repeated "hard" impacts by a golf club during the golf ball's normal useful life. If adhesion, toughness, flexibility and/or hardness are at an undesirable level, ink deposited upon a topcoat (e.g., a logo printed upon a finished ball having an underlying topcoat or a clear coat) and/or ink deposited under a topcoat (e.g., a production print formed by the ink layer being interposed between the cover or primer coat and an overcoat and/or a topcoat) will abrade, flake, crack or otherwise separate from the golf ball topcoat, overcoat, the cover and/or the primer coats. After repeated impacts, such lack of adhesion, toughness, flexibility and/or hardness yields an unsightly golf ball.

The adhesion of the ink to the ball is in turn affected by the sufficiency of the curing of the ink. When the ink is not properly cured, it tends to detach from the surface of the golf ball. Separation of UV radiation curable ink, and to a lesser extent UV-visible radiation curable ink, from the ball is more likely when the ink or ink layer is thicker because the ink is less likely to be completely through-cured, i.e. cured through the entire thickness of the ink coating.

Also, UV radiation curable inks which contain certain colored pigments are more prone to insufficient curing, even when UV radiation and visible light are used to cure the coating. Pigments, particularly those which impart the colors black, blue, green or white to the ink, absorb the UV light which is necessary to activate the UV photoinitiators which initiate the curing of the ink. Specifically, these pigments and the UV photoinitiators absorb UV light having the same UV wavelengths. Because both the pigments and the UV photoinitiators are competing for the same UV radiation, some of the UV photoinitiators in the ink, particularly those below the ink layer's outer surface will not absorb enough energy needed to initiate the curing in the lower portions of the ink layer. Also, the UV photoinitiators at the surface of the ink absorb the UV light, thereby limiting the amount of UV light that penetrates to lower depths in the ink layer to permit curing of the ink layer at the substrate interface. As a result, insufficient curing often occurs. The layer of ink nearest the ball may be insufficiently cured, while the outer layer of the ink may look and feel completely cured. To remedy such deficiency, more energy and/or longer curing times can be used. However, increases in energy doses and curing time is not desirable since it leads to inefficient production of golf balls as well as potentially adverse effects on the golf ball materials. For example, to increase the curing energy, the line speed, i.e., the speed by which the balls are moved toward the curing energy source, must be reduced. This decrease in line speed tends to melt or sink the cover on the golf balls due to the heat output of the curing source. Therefore, there exists a need for a method of curing radiation curable inks for golf balls which thoroughly cures upon exposure to radiation without exposing the substrate to substantially greater energy.

To overcome these and other problems, novel curable inks (1) that are low energy curable, (2) that require minimal cooling, if any, (3) that are almost instantaneously cured, (4) that obviate or reduce the need for costly ventilating systems and (5) that permit the use of a broader range of polymeric cover, intermediate shell (or windings) or core golf ball and game ball materials, are sought. Additionally, novel methods of cure of the inks which utilize low energy, that result in minimal heat generation, that do not require costly ventilation systems and/or inert atmospheres, and that permit the use of a broader range of polymeric cover, intermediate shell (or windings) or core golf ball and game ball materials, are sought. These requirements are met by the low power electron beam curable inks and the multiple source curing process which are the subject of the present invention.

SUMMARY OF THE INVENTION

The present invention includes a novel, cost-effective, and rapid radiation curing method for forming an ink print on a curved surface such as that found on a game ball, a golf ball, or the like. In one or more embodiments of the present invention, the many advantages obtained may include: a process to cure radiation curable ink, in particular a process of curing which includes exposure to a combination of a first radiation which includes UV radiation, visible light radiation, or both UV radiation and visible light radiation, and a second radiation which includes electron beam radiation, having a high cure rate and allowing for the use of a wide range of color pigments in the ink; a curing process that renders deep and complete curing with a minimum of temperature increase; a method of forming a logo or production print on such a game ball, golf ball, etc. curved surface with improved durability, flexibility, hardness, etc., by the use of radiation curing; UV/visible light and electron beam curable ink compositions having improved durability, flexibility, hardness, abrasion resistance, adhesion and ink transfer properties; UV/visible light and electron beam curable ink compositions suitable for production or logo printing on game balls, golf balls and the like (e.g., sports equipment such as club heads, helmets etc., and other curved surfaces) having improved durability, flexibility, hardness, abrasion resistance, adhesion and ink transfer properties.

These embodiments are accomplished by the use of a novel, cost-effective and rapid method of curing ink layers on the curved surfaces of game balls, golf balls or the like using a combination of UV/visible light and electron beam curing radiation.

In one embodiment of the invention, radiation curable water-insoluble ink is deposited on, e.g., a golf ball to produce a logo or a production print, which is thereafter cured by an initial application of visible light radiation and subsequently by application of electron beam curing radiation.

In one embodiment of the invention, radiation curable water-insoluble ink is deposited on, e.g., a golf ball to produce a logo or a production print, which is thereafter cured by an initial application of UV radiation and subsequently by application of electron beam curing radiation as described in U.S. Pat. No. 6,001,898, the disclosure of which is incorporated herein by reference.

In one embodiment of the invention, radiation curable water-insoluble ink is deposited on, e.g., a golf ball to produce a logo or a production print, which is thereafter cured by an initial application of UV and visible light radiation and subsequently by application of electron beam curing radiation.

In one embodiment of the invention, radiation curable water-insoluble ink is deposited on, e.g., a golf ball to produce a logo or a production print, which is thereafter cured by an initial application of electron beam curing radiation and subsequently by application of visible light radiation, UV radiation, or UV and visible light radiation.

In one embodiment of the invention, a first layer of radiation curable water-insoluble ink is deposited on, e.g., a golf ball to produce a logo or a production print, which is thereafter cured by an initial application of visible light radiation, UV radiation, or UV and visible light radiation. Subsequently, a second layer of radiation curable water-insoluble ink is deposited and is cured by application of a combination of visible light radiation, UV radiation, or UV and visible light radiation plus electron beam curing radiation. The electron beam curing is sufficient to cure uncured ink in both the first and the second layers.

In another embodiment, the invention comprises a radiation curable water-insoluble production ink for forming an inked surface on at least a portion of the surface of a game ball, golf ball or the like wherein at least the inked surface is coated with a topcoat. The ink comprises an ink base containing at least a prepolymer with at least two prepolymer functional moieties. The prepolymer is selected from the group consisting of a first acrylate, an ester and mixtures thereof and a polymerizable monomer.

To increase the cure rate of the ink a photoinitiator is added to the ink. The photoinitiator can also promote sufficient through-curing of the ink. Suitable photoinitiators include UV photoinitiators, visible light photoinitiators, or combinations thereof, a more detailed discussion of which is provided below.

A visible light photoinitiator can be used in addition to or as a substitute for UV photoinitiators. Preferably, a combination of UV and visible light photoinitiators, or a photoinitiator having a significant portion of its absorbance spectrum in both the UV and the visible regions, is included in the ink to promote the complete curing of the coating. As used herein, visible light photoinitiators refer to both photoinitiators which have an absorbance spectrum in both the UV and visible light regions as well as photoinitiators which have an absorbance spectrum only in the visible light region.

As noted earlier, pigments in inks (particularly black, blue, green and white ones) absorb at the same UV light wavelengths at which UV photoinitiators must absorb in order to start the curing of the ink. As a result, the UV photoinitiators in the ink beneath the surface of the ink layer will be deprived of adequate UV light by the pigments and curing of the ink will be limited to the upper ink layer. In other words, the UV photoinitiators and pigments compete for the same UV light, which substantially limits the activating radiation available to photoinitiators nearest to the ball in an ink layer.

By adding to an ink, with or without UV photoinitiators, a visible light photoinitiator which absorbs radiation having longer wavelengths than that absorbed by the pigments and UV photoinitiators, the speed and completeness of the through-cure of the ink will be increased. See U.S. Pat. No. 6,013,330, the disclosure of which is incorporated herein by reference. The amount of energy needed for through-cure can be reduced. Since a light source used for curing can be selected to emit light not only in the UV region of the spectrum (which is absorbed by the pigments and by the UV photoinitiators), but also visible light at certain wavelengths, a visible light photoinitiator added to the ink can absorb such visible light, that would otherwise be wasted and turned to unwanted heat, during the curing of the ink and therefore more effectively initiate the curing of the ink. In other words, inclusion of a visible light photoinitiator will allow the ink to make use of visible light from a UV/vis light source which is not being absorbed by the to the same extent as the UV light by the pigments, thereby promoting the through-cure of the ink and more efficiently using the energy emitted by the light source.

Preferably, the visible light photoinitiator should have a substantial part of its absorbance spectrum (i.e., greater than about 50 percent) at wavelengths greater than about 400 nm. More preferably, the visible photoinitiator should have a maximum absorbance at a wavelength greater than about 400 nm. Also, the amounts of visible light photoinitiators that can be included in the ink range from about 0.01 to 3 parts per 100 parts ink.

Added to the production ink base is an adhesion promoting component which may be a carboxylic acid functional monomer, a carboxylic acid functional oligomer, an ester functional monomer, an ester functional oligomer or mixtures thereof. The adhesion promoting component has at least one adhesion promoting functional moiety comprising at least about 2 moles of a carbonyl functionality per mole of the adhesion promoting component. It is sufficient to maintain adhesion of at least about 75 percent of the curved inked surface to the topcoat and to the surface of the game ball, golf ball or the like after curing and after coating with the topcoat.

A further embodiment is directed to a process for forming a production print on at least a portion of the curved surface of a game ball, golf ball or the like. For example, with golf balls as an example, the process comprises providing a golf ball having a curved surface; coating at least a portion of the golf ball surface with at least a layer of a radiation curable water-insoluble production ink; curing the coating layer with an initial application of visible light radiation and subsequently by application of electron beam radiation; and coating at least the inked surface with a topcoat.

An additional embodiment of the present invention is directed to an improved radiation curable water-insoluble logo ink composition. The water-insoluble logo ink includes an ink base comprising a prepolymer having at least two prepolymer functional moieties. The prepolymer is selected from the group consisting of a first acrylate, an ester and mixtures thereof and at least a polymerizable monomer. Photoinitiators, including visible light photoinitiators, suitable for preparing the radiation curable water-insoluble inks of this invention are also used in formulating these logo inks.

Included in the logo ink base is a toughening agent. The toughening agent is sufficient to maintain adhesion of the logo ink to the topcoat of at least about 75 percent of the inked surface after electron beam radiation curing. The toughening agent may be sterically hindered monomers, dimers, trimers or oligomers, such as sterically hindered acrylates. Preferably, the toughening agents are also reactive diluents, (i.e., they form covalent bonds upon polymerization and are incorporated into the structure of the ink layer).

A still further embodiment involves a process for forming a logo on a game ball or golf ball topcoat. For example, in the case of a golf ball, the process comprises providing a golf ball having a topcoated surface; coating at least a portion of the surface with at least a layer of an electron beam curable water-insoluble logo ink; and curing the ink with an initial application of visible, UV, or visible/UV light radiation and subsequently by application of electron beam radiation.

In another embodiment the electron beam can be applied before the UV, visible, or UV/visible radiation.

In yet another embodiment, the exposure to the electron beam can be of a time sufficient for additional curing of both a logo ink and an underlying production ink.

While the present invention is described mainly in terms of a golf ball, it should be understood that a variety of additional curved substrates (e.g., game balls) may be printed upon using the ink formulations and methods described and claimed herein without departing from the scope of the present invention.

DETAILED DESCRIPTION OF THE PREFERRED EMBODIMENTS

The following detailed description is provided to aid those skilled in the art in practicing the present invention. However, it should not be construed to unduly limit the scope of the present invention. Variations and modifications in the embodiments discussed may be made by those of ordinary skill in the art without departing from the invention.

As used herein, "radiation" refers to electromagnetic radiation having wavelengths in the ultraviolet and/or visible light regions of the spectrum, and more specifically, to electromagnetic radiation having a wavelength greater than about 400 nm. "Radiation curable", as used herein, refers to the ability to be cured with electromagnetic radiation having wavelengths in the UV and/or visible light regions of the spectrum and also by electron beam radiation. As used herein, "water-insoluble" means the cured ink is resistant to dissolution by water.

The radiation curable water-insoluble production ink of the present invention is formed by modifying an ink base composition. The ink base composition comprises a prepolymer having at least two prepolymer functional moieties and a photoinitiator. The prepolymer is selected from the group consisting of a first acrylate, an ester, and mixtures thereof and at least one polymerizable monomer.

Suitable first acrylates for use in conjunction with the present invention include, but are not limited to, acrylated amines, acrylic acrylates, oil acrylates, melamine acrylates, heterocyclic acrylates, epoxy acrylates, epoxy acrylates of bisphenol A, epoxy acrylates of bisphenol F, epoxy acrylates of bisphenol S, novolak acrylates, urethane acrylates, ether acrylates, polyether acrylates, thiol acrylates, thioether acrylates, polythioether acrylates, silicon acrylates, polystyryl acrylates, ester acrylates, polyester acrylates, aromatic acrylates, aliphatic acrylates, half-ester acrylates, di-ester acrylates, vinyl acrylates, polybutadiene acrylates, allyl acrylates, polyene acrylates, methacrylates, methacrylated amine, acrylic methacrylates, methacrylic methacrylates, oil methacrylates, melamine methacrylates, heterocyclic methacrylates, epoxy methacrylates of bisphenol A, epoxy methacrylates of bisphenol F, epoxy methacrylates of bisphenol S, novolak methacrylates, urethane methacrylates, ether methacrylates, polyether methacrylates, thiol methacrylates, thioether methacrylates, polythioether methacrylates, silicon methacrylates, polystyryl methacrylates, ester methacrylates, polyester methacrylates, aromatic methacrylates, aliphatic methacrylates, half-ester methacrylates, di-ester methacrylates, vinyl methacrylates, polybutadiene methacrylates, allyl acrylates, polyene methacrylates and the like and mixtures thereof.

The first acrylates are acrylated prepolymers having high molecular weights, for example, of at least about 500 grams per mole and have at least 2 polymerizable functionalities (i.e., prepolymer moieties) per molecule of prepolymer. Often, the acrylated prepolymers and the ester prepolymers have a high viscosity (e.g., 100–20,000 centipoise at 25° C.) and a molecular weight of between about 500 to about 5,000 grams per mole and between about 2 to 6 reactive prepolymer functional moieties per molecule. The ester may be an unsaturated ester.

The polymerizable monomers are considered reactive diluents. They may be monofunctional monomers or polyfunctional monomers. These polymerizable monomers are used to modify (e.g., typically to reduce) the viscosity of the acrylate prepolymer or the ester prepolymer. However, these monomers also aid in the cross-linking of the prepolymers upon electron beam radiation curing thereof. These monomers include, but are not limited to, one or more monofunctional acrylates or one or more polyfunctional acrylates. For example, the monofunctional acrylates have one acryloyl or methacryloyl group per acrylate molecule whereas the polyfunctional acrylates have two or more acryloyl or methacryloyl groups per acrylate molecule.

Theoretically, upon exposure to UV and/or visible light it is conceivably possible to cure (i.e., polymerize) a polymerizable ink without a photoinitiator. In practice, however, a photoinitiator is required to achieve an economically feasible cure rate (i.e., increased cure rate). Increased cure rates yield higher production rates and lower per unit production costs of various inked articles such as game balls, golf balls and the like.

Examples of ultraviolet light photoinitiators compatible with the ink base of the present invention (e.g., ink base for production ink or ink base for logo ink) include free radical photoinitiators. (See Jean-Pierre Fouassier, *Photoinitiators and Photosensitizers of Polymerization: A Short Review,* Vol. 6, European Coatings Journal, pp. 412–419 (1996). Specific examples of free radical photoinitiators include, but are not limited to, oligo(2-hydroxy-2-methyl-1-(4-(1-methylvinyl)phenyl)propanone), 2-hydroxy-2-methyl-1-phenyl-1-propanone, 2,4,6-trimethylbenzophenone, 4-methylbenzophenone, 2,2-dimethoxy-1,2-diphenylethanone, 2-butoxy- 1,2-diphenylethanone, 2-(2-methyl propoxy)- 1,2-diphenylethanone, benzophenone, 2-alpha hydroxy ketone, other alpha hydroxy ketones, other benzophenone derivatives or mixtures thereof. Other photoinitiators (i.e., photo-polymerization initiators) compatible and suitable for use with the inks of the present invention are well known in the art. Additional examples of suitable photoinitiators are listed in U.S. Pat. Nos. 4,670,295 (Quinn et al.) and 4,680,368 (Nakamoto et al.), which are incorporated herein by reference in their entirety.

A preferred photoinitiator is Esacure™ KIP-100F that is commercially available from Sartomer. This photoinitiator (Esacure™ KIP-100F) is a liquid mixture of 70 percent by weight of oligo(2-hydroxy-2-methyl-1-(4-(1 -methylvinyl) phenyl)propanone) with a M.W.=204.7 grains/mole per repeating unit and 30 percent by weight of 2-hydroxy-2-methyl-1-phenyl-1-propanone with a M.W.=164.2 grains/mole. This commercially available photoinitiator is a highly reactive, non-yellowing initiator for the polymerization of radiation curable inks. It is further characterized by the following physical properties:

| | |
|---|---|
| Appearance | Clear, slightly yellow viscous liquid |
| Odor | Faint, characteristic |
| Solubility | Insoluble in water, soluble in most common organic solvents, monomers, prepolymers. Compatible with resins. |
| Boiling Point | >200° C. |
| Flash Point | 110° C. (Closed cup-Pensky-Martens) |
| Density | 1.1 g/cm$^3$ at 20° C. |
| Viscosity | 15–30 Pa.s. (Brookfield 20 rpm 20° C.) |
| CAS No. | 7473-98-5 |

In accordance with the present invention, the photoinitiator(s) is/are added to the ink base in an amount sufficient to increase the cure rate of a radiation curable ink. However, photoinitiators are typically extremely expensive. Therefore, it is preferable to use a minimum amount of photoinitiator without unduly sacrificing cure rates, production rates or production costs. For example, the photoinitiator is present from about 0.05 percent to about 15 percent by weight of the total weight of the ink. However, it is preferred to use from about 0.05 percent to about 5 percent of the photoinitiator, more preferably, from about 0.1 percent to about 0.5 percent by weight. For example, 0.1 percent of Esacure™ KIP-100F is sufficient to formulate an radiation curable production ink or logo ink according to the present invention.

Other suitable commercially available photoinitiators include, but are not limited to, 1-hydroxy cyclohexyl phenyl ketone (Irgacure™ 184); $n^5$-2,4-cyclopentadien-1-yl) ((1,2, 3,4,5,6-n)-(1-methyl ethyl)benzene) -iron (+) -hexafluorophosphate (-1) (Irgacure ™ 261); 2-benzyl-2-n-dimethylamino-1-(4-morpholinophenyl)- 1 -butanone (Irgacure™ 369); 1 -hydroxycyclohexyl phenyl ketone (50 percent by weight) plus benzophenone (50 percent by weight) (Irgacure™ 500); bis(2,6-dimethoxy benzoyl)-2,4,4 trimethylpentyl phosphineoxide (DMBAPO) (25 percent by weight) plus 2-hydroxy-2-methyl-1-phenyl-propan-1-one (HMMP) (75 percent by weight) (Irgacure™ 1700); 4-(2-hydroxyethoxy) phenyl-(2-hydroxy propyl)ketone (Irgacure™ 2959); 2,4,6-Trimethyl benzoyl diphenyl phosphineoxide (TPO) (50 percent by weight) plus 2-hydroxy-2-methyl-1-phenyl-propan-1-one (HMPP) (50 percent by weight) (Darocur™ 4265); 2,2-dimethoxy-2-phenylacetophenone (BDK) (Irgacure™ 651); bis($n^5$-2,4-cyclopentadien-1-yl), bis (2,6-difluoro-3-(1H-pyrrol-1-yl) phenyl) Titanium (CGI-784); 2-methyl-1-(4-(methylthio) phenyl)-2-morpholino propan-1-one (MMMP) (Irgacure™ 907); 2-hydroxy-2-methyl-1-phenyl-propan-1-one (HMPP) (Darocur™ 1173); or mixtures thereof. These photoinitiators are commercially available from Ciba-Geigy.

In addition, the ink base preferably includes visible light photoinitiator(s) (i.e., a photoinitiator having at least a part of its absorbance spectrum in the visible region or photoinitiator having its entire absorbance spectrum in the visible light region). These visible light photoinitiators can be used in conjunction with or as substitutes for UV photoinitiators. Preferably, a combination of UV and visible light photoinitiators are used. More preferably, the visible light photoinitiator(s) should have a substantial portion, i.e., greater than about 50 percent of its absorbance spectrum at wavelengths greater than about 400 nm. Even more preferable, the visible light photoinitiator should have a maximum absorbance at wavelengths greater than about 400 nm.

When a combination of UV and visible light photoinitiators or photoinitiators having an absorbance spectrum in both the UV and visible light regions are used in the ink, the ink is cured using UV and visible light. When only UV photoinitiators or only visible light photoinitiators having an absorbance spectrum only in the absorbance spectrum are used, then the ink may be cured using only UV or only visible light, respectively.

Visible light photoinitiators compatible with the ink base of the present invention (e.g., ink base for production ink or ink base for logo ink) include photoinitiators having at least a part of their absorbance spectrum in the visible region or photoinitiators having their entire absorbance spectrum in the visible light region. Preferably, the visible light photoinitiator(s) should have a substantial portion, i.e., greater than about 50 percent of its absorbance spectrum at wavelengths greater than about 400 nm. Even more preferable, the visible light photoinitiator should have a maximum absorbance at wavelengths greater than about 400 nm.

When a combination of UV and visible light photoinitiators or photoinitiators having an absorbance spectrum in both the UV and visible light regions are used in the ink, the ink is cured using UV and visible light. When only UV photoinitiators or only visible light photoinitiators having an absorbance spectrum only in the absorbance spectrum are used, then the ink may be cured using only UV or only visible light, respectively.

Visible light photoinitiators which are particularly suitable for the present invention include fluorene derivatives such as those described in U.S. Pat. No. 5,451,343 to Neckers et al., U.S. Pat. No. 5,395,862 to Neckers et al. and Dietliker, Chemistry & Technology of UV & EB Formulation for Coatings, Inks & Paints, vol. III, pp. 228–299, Selective Industrial Training Assocs. Ltd. (1991) (the contents of which are incorporated herein by reference for all purposes).

Preferred fluorene derivatives useful as visible light photoinitiators are 5,7-diiodo-3-butoxy-6-fluorene (with a maximum absorbance at 470 nm); 2,4,5,7-tetraiodo-3-hydroxy-6-fluorene (with a maximum absorbance at 535 nm); and 2,4,5,7-tetraiodo-9-cyano-3-hydroxy-6-fluorene (with a maximum absorbance at 635 nm), all of which are available from Spectra Group Limited, Inc.

Moreover, depending upon the photoinitiator, one or more co-initiators may be used in combination with the visible light photoinitiator to enhance the curing of the ink. One of skill in the art is aware of whether a given visible light photoinitiator should be used with a co-initiator and which co-initiator(s) should be combined with the photoinitiator.

For example, when fluorene derivatives are used as visible light photoinitiators, an onium salt and/or an aromatic amine can be used as co-initiators. Suitable onium salts include iodonium salts (e.g. phenyl-4-octyloxyphenyliodonium hexafluoroantimonate (OPPI), dodecyldiphenyliodonium hexafluoroantimonate (DDPI), and (4-(2-tetradecanol)-oxyphenyl)iodonium hexafluoroantimonate); sulfonium salts; pyrylium salts; thiapyrylium salts; diazonium salts and ferrocenium salts. Suitable amine co-initiators include N,N-dimethyl-2,6-diisopropylaniline (DIDMA), ethyl- or octyl-para-(dimethylamino)benzoate (EDAB or ODAB respectively) and N-phenylglycine (NPG).

Additionally, triarylalkyl-borate ammonium salts can be used in conjunction with the fluorene visible light photoinitiator instead of the amine co-initiator. Examples of such borate co-initiators include tetramethylammonium triphenylbutyl borate and butyryl choline triphenyl butylborate (available from Spectra Group Limited).

Other visible light photoinitiators that are useful for this invention include without limitation titanocene photoinitiators (particularly fluorinated diaryl titanocenes such as bis ($\eta^5$-cyclopentadienyl) bis-[2,6-difluoro-3-(1H-pyrr-1 -yl) phenyl]-titanium); ketocoumarine photoinitiators (e.g. 3-ketocoumarine); acridine dyes (e.g. acriflavine); xanthene dyes (e.g. rose bengale or fluorescein); azine dyes, thiazine dyes (e.g. methylene blue); and polymethine dyes (e.g. cyanines or merocyanines).

Examples of co-initiators which are compatible with the "dye" photoinitiators include amines (e.g. triethanolamine); phosphines/arsines (e.g. triphenylphosphine or triphenylarsine); sulphinates (e.g. sodium p-tolysulphinate); enolates (e.g. dimedone enolate); carboxylate (e.g. ascorbic acid); organotin compounds (e.g. benzyltrimethylstannane); borates (e.g. triphenyl borate); and trichloromethyl-s-triazines.

Because of their efficient absorptivity of visible light, the amounts of visible light photoinitiators used in the ink is generally less than the amounts of UV photoinitiators used. In one embodiment, from about 0.01 to 3 parts per 100 parts ink of visible light photoinitiators is included in the ink. Preferably about 0.02 to 0.1 parts is used and more preferably about 0.05 to 0.07 parts is included.

The ratio of the visible light photoinitiator to co-initiator (s) can range from about 1:5 to 1:30. More preferably the ratio is about 1: 10 to 1:25 and even more preferably from about 1:20 to 1:25.

The radiation curable water-insoluble production ink of the present invention is formed by modifying the base composition to incorporate at least an adhesion promoting component. An adhesion promoting component added to the ink base to yields a production ink. The adhesion promoting component improves the adhesion of the production ink to, for example, a golf ball cover or a primer coat when applied thereto and after being cured by radiation. The adhesion promoting component also improves the adhesion of the ink to a topcoat (e.g., a urethane topcoat) or to an overcoat (e.g., a water based urethane coat or a solvent based coat) when such coats are applied over the cured production ink.

The adhesion promoting component is selected from among carboxylic acid functional monomers, carboxylic acid functional oligomers, ester functional monomers, ester functional oligomers and mixtures thereof. The adhesion promoting component has at least one adhesion promoting functional moiety comprising at least about 2 moles of a carbonyl functionality per mole of the adhesion promoting component. The adhesion promoting component is added to the ink base to promote intercoat adhesion of the production ink. Intercoat adhesion, as used herein, is defined as adhesion to an underlying cover and/or primer coat and adhesion to a topcoat and/or overcoat.

Preferably, the adhesion promoting component is selected from acrylate oligomers, aromatic acid acrylate esters, aromatic acid acrylate half esters, aromatic acid methacrylate esters, aromatic acid methacrylate half esters and mixtures thereof. The adhesion promoting component has at least about 2 moles of a carbonyl functionality, typically between about 3 to about 12 moles of a carbonyl functionality per mole of the adhesion promoting component or any value therebetween. Preferably, the adhesion promoting component has between about 3.5 to about 11 moles of a carbonyl functionality per mole of the adhesion promoting component. Further, the adhesion promoting component has a molecular weight of about 1,000,000 grams per mole or less, typically between about 200 grams per mole to about 1,000,000 grams per mole.

The carbonyl functionality of the adhesion promoting component can be a carboxylic acid functional moiety, an ester functional moiety, an anhydride functional moiety or a mixture thereof. Preferably, the adhesion promoting functional moiety is a carboxylic acid having, for example, an acid number of at least about 100. The acid number is defined as the quantity of base, expressed in milligrams of potassium hydroxide, that is required to neutralize the free acids present in one gram (1 gm) of the adhesion promoting component of the production ink, logo ink, etc. The acid number of the adhesion promoting component is about 300 or less, typically between about 100 to about 300 or any number therebetween. Preferably the acid number is between about 150 to about 250 and most preferably between about 200 to about 230.

Further, the adhesion promoting component is present in an amount of at least about 1 percent by weight of the total weight of the production ink. All weight percentages provided below are relative to the total weight of the ink containing a given component unless specifically indicated otherwise. The adhesion promoting component is present in an amount of about 75 percent by weight or less, typically between about 1 percent to about 60 percent or any value therebetween (e.g., about 10 percent to about 20 percent) and most preferably between about 5 percent to about 25 percent by weight.

Examples of suitable adhesion promoting components include products from SARTOMER Company, Inc. (Exton, Pa.) designated as SARBOX™ SB-501, SARBOX™ SB-401, SARBOX™ SB-510E35 and SARBOX™ SB-520E35. SB-501 is a highly functional, carboxylic acid terminated oligomer blended in 40 percent by weight (of the total weight of SB-501) of ethoxylated trimethylolpropane triacrylate monomer (designed as SR-454). SB-501 is further characterized as indicated below:

| | |
|---|---|
| Color, APHA | 100–200 |
| Weight/gallon (lbs./gal.) | 9.7–9.9 |
| Viscosity (cps) @ | |
| 25° C. | 200,000+ |
| 40° C. | 75,000–90,000 |
| 60° C. | 8,000–15,000 |
| 80° C. | 2,500–4,000 |
| Acid Number (mg KOH/gm) | 130–180 |
| based on SARBOX ™ Resin Content of (percent) | 60.0 ± 2.0 |
| Flash Point (° F., Setaflash) | 200 |

SB-401 is a highly functional, carboxylic acid terminated, solid oligomer dissolved in 30 percent by weight (of the total weight of SB-401) of solvent. SB-401 is further characterized as indicated below:

| | |
|---|---|
| Color, APHA | 150–250 |
| Weight/gallon (lbs./gal.) | 9.3–9.6 |
| Viscosity (cps) @ | |
| 25° C. | 40,000–60,000 |
| 40° C. | 10,000–20,000 |
| 60° C. | 2,000–4,000 |
| Acid Number (mg KOH/gm) | 130–160 |
| based on SARBOX ™ Resin Content (non-volatile content, percent) | 68.0 ± 2.0 |
| Flash Point (° F., PMCC, Solvent) | 136 |

SB-510E35 is a 35 percent by weight (of the total weight of SB-510E35) moderately functional carboxylic acid containing methacrylate oligomer (i.e., aromatic acid methacrylate half ester resin) blended in 65 percent by weight (of the total weight of SB-510E35) of ethoxylated trimethylolpropane triacrylate monomer (designated as SR-454, the chemical structure of which is incorporated herein by reference). SB-510E35 is further characterized as indicated below:

| Color, APHA | 150–250 |
|---|---|
| Weight/Gallon (lbs/gal.) | 9.70–9.90 |
| Viscosity (cps) @ | |
| 25° C. | 80,000–120,000 |
| 40° C. | 40,000–60,000 |
| 60° C. | 3,500–7,000 |
| Acid Number (mg KOH/gm) | 200–230 |
| based on SARBOX ™ Resin Content (percent) | 35 ± 2 |
| Flash Point (° F., Setaflash) | >200 |

SB-520E35 is a 35 percent by weight (of the total weight of SB-520E35) moderately functional carboxylic acid containing acrylate oligomer (i.e., aromatic acid acrylate half ester resin) blended in 65 percent by weight (of the total weight of SB-520E35) of ethoxylated trimethylolpropane triacrylate monomer (designated as SR-454). SB-520E35 is further characterized as indicated below:

| Color, APHA | 150–250 |
|---|---|
| Weight/Gallon (lbs/gal.) | 9.70–9.90 |
| Viscosity (cps) @ | |
| 25° C. | 80,000–120,000 |
| 40° C. | 40,000–60,000 |
| 60° C. | 3,500–7,000 |
| Acid Number (mg KOH/gm) | 200–230 |
| based on SARBOX ™ Resin Content (percent) | 35 ± 2 |
| Flash Point (° F., Setaflash) | >200 |

Both SB-510E35 and SB-520E35 contain 100 percent reactive solids. These products are described in SARTOMER COMPANY PRODUCT MANUAL AND APPLICATION GUIDE.

The production ink of the present invention may further comprise a viscosity reducing component and/or a flexibility promoting component. The viscosity reducing component is any low molecular weight reactive diluent that reduces the viscosity of the production ink. Examples of viscosity reducing components (produced and sold by the SARTOMER Company) compatible with the present invention include, but are not limited to, highly propoxylated glyceryl triacrylate (SR-9021), ethoxylated$_3$ trimethylolpropane triacrylate (SR-454), ethoxylated$_6$ trimethylolpropane triacrylate (SR-499), ethoxylated$_9$ trimethylolpropane triacrylate (SR-502), ethoxylated$_{15}$ trimethylolpropane triacrylate (SR-9035), ethoxylated$_{20}$ trimethylolpropane triacrylate (SR-415), pentaerythritol triacrylate (SR-444), propoxylated glyceryl triacrylate (SR-9020), propoxylated$_3$ trimethylolpropane triacrylate (SR-492), propoxylated$_6$ trimethylolpropane triacrylate (SR-501), trimethylolpropane triacrylate (SR-351), trimethylolpropane trimethylacrylate (SR-350), tris(2-hydroxy ethyl) isocyanurate triacrylate (SR-368, SR-368D and SR-290), dipentaerythritol pentaacrylate (SR-399), di-trimethylolpropane tetraacrylate (SR-355), ethoxylated pentaerythritol tetraacrylate (SR-494), pentaacrylate ester (SR-9041), pentaerytbritol tetraacrylate (SR-295) and mixtures thereof. The preferred viscosity reducing agent is ethoxylated$_3$ trimethylolpropane triacrylate (SR-454) having a molecular weight of about 428 grams. Typically, the viscosity reducing component is present between about 10 percent to about 50 percent by weight of the total weight of the adhesion promoting component and any value therebetween, and, preferably, from about 0.1 percent to about 37.5 percent.

The flexibility promoting component compatible with the present invention has a post cure elastic modulus of between about 200 to about 60,000 pounds per square inch, a post cure tensile strength of between about 50 to about 2,500 pounds per square inch and a post cure elongation of between about 5 percent to about 350 percent. Further, the flexibility promoting component is any component that has a glass transition temperature (i.e., Tg) below about room temperature (e.g., below about 25° C.) The flexibility promoting component includes, but is not limited to, a second acrylate, a ring opening heterocycle, or mixtures thereof, wherein the ring opening heterocycle is selected from the group consisting of cyclic esters, cyclic lactones, cyclic sulphides, cyclic acetals, cyclic siloxanes and mixtures thereof. The second acrylate is selected from the group consisting of an aliphatic urethane acrylate, an aromatic urethane acrylate, a polyether acrylate, an acrylated amine, a polybutadiene acrylate, a melamine acrylate and mixtures thereof. The cyclic ester of the flexibility promoting component includes an epoxide.

Additional examples of flexibility promoting components compatible with the present invention include, but are not limited to, urethane acrylate base resins designated by the SARTOMER Company as CN-962, CN-965, CN-966, CN-972, CN-973 and CN-981 and urethane acrylate resin/monomer blends designated as CN-965A80, CN-966A80, CN-966H90, CN-966J75, CN-973A80, CN-973H85, CN-973J75 and CN-981B88 and described in the SARTOMER COMPANY PRODUCT MANUAL AND APPLICATION GUIDE. Of these, CN-962, CN-965 and CN-966 are aliphatic urethane acrylate oligomers having a polyester backbone. CN-973 is an aromatic urethane acrylate having a polyester backbone. CN-972 is an aromatic urethane acrylate having a polyester backbone. CN-981 is an aliphatic urethane acrylate having a polyester backbone. In CN-965A80, CN-966A80, CN-966M90, CN-966J75, CN-973A8, CN-973M85, CN-973J75 and CN-981B88, the CN-966, CN-973 and CN-981 are the base resins, respectively. The letters A, B, H and J as used in the SARTOMER product designations refer to the monomers blended with the base resins. The number following the monomer letter designation indicates the percent by weight of the base resin, the remainder being the amount of the monomer making up the blend (i.e., totalling 100 percent by weight). Monomers A, B, H and J correspond to the SARTOMER designations tripropylene glycol diacrylate (SR-306), 1,6-hexanediol diacrylate (SR-238), 2(2-ethoxyethoxy) ethylacrylate (SR-256) and isobornyl acrylate (SR-506), respectively.

The flexibility promoting component is optionally added to the production ink composition in an amount of about 75 percent by weight or less, typically between about 5 percent to about 60 percent by weight or any value therebetween. Preferably, the flexibility promoting component is present between about 10 percent to about 30 percent by weight and most preferably between about 15 percent to about 20 percent by weight.

Additionally, the production ink may optionally contain a solvent in an amount of between about 1 percent to about 30 percent by weight of the total weight of the ink composition. In some embodiments it is preferred to have substantially no, i.e., less than 0.5 percent, of non-polymerizable organic solvents. Examples of solvents compatible with the present invention include, but are not limited to, (Fast Evaporating Rate Solvents): acetone, ethylacetate (85 to 88 percent), ethyl acetate (95 to 98 percent), ethyl acetate (99 percent), methyl acetate (80 percent), methyl ethyl ketone, iso-propyl acetate (95 to 97 percent), iso-propylether, tetrahydrofuran; (Medium Evaporating Rate Solvents): iso-butyl acetate (90 percent), n-butyl acetate (90 to 92 percent), n-butyl acetate (99 percent), sec-butyl acetate (90 percent), sec-butyl alcohol, tert-butyl alcohol, 1,1,1-trichloroethane, ethyl ketone, ethyl alcohol 200 PRF. ANHD, ethyl alcohol 190 PRF. ANHYD, ethyl alcohol 190 PRF. (95 percent), methyl alcohol, methyl isobutyl ketone, methyl isopropyl ketone, methyl n-propyl ketone, 2-nitropropane, n-propyl acetate (90 to 92 percent), iso-propyl alcohol, n-propyl alcohol; (Slow Evaporating Rate Solvents): amyl acetate (ex Fuel Oil) (85 to 88 percent), amyl acetate primary (mixed isomers)(95 percent), amyl alcohol primary (mixed isomers), tert-amyl alcohol, iso-butyl alcohol, n-butyl alcohol, butyl dioxitol™ glycol ether, butyl oxitol™ glycol ether, m-cresol, cyclohexanol, cyclohexanone, diacetone alcohol, dibasic ester, diethylene glycol, diethylene glycol monobutyl ether acetate (95 percent), diisobutyl ketone, dimethyl formamide, diethylene glycol, monoethyl ether—low gravity, diethylene glycol monoethyl ether—high gravity, dipropylene glycol monomethyl ether, dipropylene glycol monomethyl ether acetate, ethyl butyl ketone, ethyl-3-ethoxy propionate, ethylene glycol, 2-ethyl hexanol, 2-ethyl hexyl acetate (95 percent), ethylene glycol monoethyl ether acetate (95 percent), ethylene glycol monoethyl ether acetate (99 percent), ethylene glycol monobutyl ether acetate, hexylene glycol, isobutyl isobutyrate, isophorone, methyl n-amyl ketone, diethyl glycol monomethyl ether, methyl isoamyl ketone, methyl isobutyl carbinol, ethylene glycol monomethyl ether, n-methyl-2-Pyrrolidone, ethylene glycol monoethyl ether, propylene glycol, propylene glycol monomethyl ether, propylene glycol monomethyl ether acetate, propylene glycol mono tertiary butyl either, triethylene glycol; (Aliphatic Hydrocarbon Solvents): Mineral spirits, naphtha, or mixtures thereof and (Aromatic Hydrocarbon Solvents): Toluene, xylene or mixtures thereof. These solvents may be obtained from the Shell Chemical Company. Additional solvents well known in the art may be used.

Faster evaporating solvents are preferred for higher production rates (i.e., more balls production printed or logo printed per unit time). However, faster evaporating solvents typically yield higher levels of volatile organic compounds (VOCs) making them susceptible to greater regulation. On the other hand, slower evaporating solvents produce lower VOCs, but require longer drying times thereby lowering production rates.

The production inks may also optionally contain colorants such as pigments or dyes that are well known to those skilled in the ink formulation art in amounts sufficient to impart a desired color.

The logo ink of the invention differs from the production ink in that it contains different additive components due to differences in performance requirements of logos versus production prints. The logo ink comprises an ink base and at least a toughening agent. A further, optional additive to the logo ink base is a friction reducing agent commonly referred to as a slip and mar agent. For logos, the same ink base as described for the production inks is used, i.e., comprising a prepolymer having at least two prepolymer functional moieties, wherein the prepolymer is a first acrylate, an ester or mixtures thereof and a polymerizable monomer. Further, the ink base contains a photoinitiator. The photoinitiators compatible with logo inks are the same as those compatible (as previously listed) with production inks. Further, the percent by weight amounts of the photoinitiators compatible with production inks are also compatible with logo inks. Preferably, the visible light photoinitiator should have a substantial portion, i.e., greater than about 50 percent of its absorbance spectrum at wavelengths greater than about 400 nm. Even more preferable, the visible light photoinitiator should have a maximum absorbance at wavelengths greater than about 400 nm. Such visible light photoinitiators are generally combined with one or more ultraviolet light photoinitiators (such as those described earlier) to promote complete cure of the ink.

Preferred fluorene derivatives useful as visible light photoinitiators are 5,7-diiodo-3-butoxy-6-fluorene (with a maximum absorbance at 470 nm); 2,4,5,7-tetraiodo-3-hydroxy-6-fluorene (with a maximum absorbance at 535 nm); and 2,4,5,7-tetraiodo-9-cyano-3-hydroxy-6-fluorene (with a maximum absorbance at 635 nm), all of which are available from Spectra Group Limited, Inc.

Suitable toughening agents are sterically hindered acrylates, preferably, monomers, dimers, trimers or oligomers. Further examples of toughening agents compatible with the logo inks of the present invention include, but are not limited to, epoxy acrylate, isobornyl acrylate (SR-506), tetrahydrofurfuryl acrylate, cyclohexyl acrylate, dicyclopentenyl acrylate, dicyclopentenyl oxyethyl acrylate, vinyl toluene (styrene), isobornyl methacrylate, tetrahydrofurfuryl methacrylate, cyclohexyl methacrylate, dicyclopentenyl methacrylate, dicyclopentenyl oxyethyl methacrylate and mixtures thereof. The toughening agents preferably are reactive diluents which increase both the hardness and the flexibility of the ink base to yield a logo ink.

The toughening agent is present typically between about 5 percent to about 75 percent by weight, or any value therebetween, of the total weight of the logo ink, preferably between about 5 percent to about 30 percent by weight and most preferably between about 10 percent to about 20 percent by weight.

In addition to the toughening agent, as noted above a friction reducing agent may be optionally added to the base ink to form a preferred logo ink. The friction reducing agent minimizes abrasion of the logo ink by sand, dirt and other abrasive materials or surfaces commonly encountered during golfing or during other typical uses of game balls. The friction reducing agent decreases the friction between the logo (i.e., printed with the logo ink) and external abrasive materials on contact, thereby minimizing the degradation of the logo. Examples of friction reducing agents compatible with the logo ink of the present invention include, but are not limited to, a solution of polyether modified dimethylpolysiloxane copolymer (BYK™-306; BYK™-341;BYK™-344), polyether modified dimethylpolysiloxane copolymer (BYK™-307; BYK™-333), a solution of acrylic functional, polyester modified dimethylpolysiloxane (BYK™-371), silicon acrylates and mixtures thereof. Of these, the reactive friction reducing agents such as silicon acrylates and acrylic functional, polyester modified dimethylpolysiloxanes (BYK™-371) are preferred because they form bonds and become integrated into the structure of the logo ink upon electron beam radiation curing. The BYK™ friction reducing agents are listed in the BYK product catalogue and may be obtained from BYK-Chemie USA of Wallingford, Conn. The friction reducing agents (e.g., dimethylpolysiloxanes) can be obtained from various companies such as Dow Corning (Midland, Mich.) and OSI Specialties (Endicott, N.Y.).

The friction reducing agent is present in an amount of about 10 percent by weight (of the total weight of the logo ink) or less, typically between about 0.1 percent to about 10 percent by weight or any value therebetween, preferably between about 0.6 percent to about 4 percent by weight and most preferably between about I percent to about 2 percent by weight.

The logo ink may further comprise from about 1 percent to about 50 percent by weight of solvent, preferably about 30 percent by weight. Suitable logo ink solvents are the same as those previously listed for use with production inks. It should be noted that certain volatile solvents evaporate to varying degrees. Thus, it is often necessary to continuously or intermittently replenish the volatilized solvent to maintain from about 1 percent to about 50 percent of the solvent in the ink composition.

During the curing step, to prevent overheating of the ink layers (e.g., production ink layers or logo ink layers), topcoats, overcoats and/or other parts of the substrate (e.g., golf ball) as well as the radiation lamps, one or more cooling gases (e.g., circulated by a cooling fan) may be provided to envelope the substrate and to dissipate heat. Such gases should be non-reactive with the substrate, the ink layers, the topcoat, the overcoat and/or other layers, especially during exposure to the radiation. Examples of suitable cooling gases include, but are not limited to, the inert gases (e.g., helium, argon etc.), nitrogen, air or mixtures thereof. In some embodiments it is preferred to have less than 1 percent oxygen in the gas. Other suitable gases are known to those skilled in the art.

Once the inks are applied and any solvents optionally removed by flashing (e.g., with infrared heat, or held at ambient temperature for 10–30 minutes or heated by forced hot air to a ball surface temperature of about 120° F. or less for about 8–60 seconds), these inks are then cured. Curing is carried out rapidly by the novel and cost-effective use of radiation, e.g., UV/visible light and electron beam.

In the case of logo inks, the ink is first deposited, in one embodiment, on a golf ball topcoat and the solvent is then optionally removed by flashing. In another embodiment, the logo ink is deposited before the top coat is applied. The logo ink is subjected to electromagnetic irradiation, either first with UV radiation and subsequently with electron beam radiation, or first with electron beam radiation and subsequently with UV radiation.

In contrast, the production ink layer is first deposited directly upon the cover surface or primer coat, the solvent is optionally removed by flashing and the ink layer is radiation cured. Finally, overcoats and/or topcoats are applied to the radiation cured ink layer.

It is believed, although applicant is not bound by this theory, that radiation, e.g., UV and/or visible light radiation ionizes components, for example, within the ink and/or in a layer in contact with the ink. Further, without being bound by theory, it is believed that the photoinitiator within the ink formulation absorbs radiation and yields reactive intermediates such as free radicals through intermolecular and/or intramolecular interactions. These reactive intermediates increase the cross-linking rate (e.g., photopolymerization rate) of the various components of the inks of the present invention with the substrate layers or articles in contact with such inks. The cross-linking imparts greater durability, intercoat adhesion, abrasion resistance and the like to production prints or logos printed with such inks. In the subsequent electron beam radiation step, it is believed that the electron beam ionizes components, for example, within the ink and/or a layer in contact with such ink, to form free radicals. These free radicals aid in the cross-linking of the various components and agents of the inks of the present invention with the substrate layers or articles in contact with such inks, thereby imparting greater durability, intercoat adhesion, abrasion resistance and the like to production prints or logos printed with such inks.

Once the inks are applied, they are cured. In one embodiment, curing is carried out by the novel use of irradiation with UV radiation, followed by irradiation with electron beam radiation. In another embodiment the radiation for curing the ink can be produced from a TV and visible light source, or from a separate UV source and a separate visible light source, simultaneously or in series. If photoinitiators which only absorb UV or only visible light are used, then the radiation can be produced from a source which primarily emits UV or visible light, respectively. Irradiation with the UV or visible light source leads to surface curing of the ink, with a fraction of the ink remaining uncured. The uncured ink is cured by subsequent irradiation using electron beam radiation. The electron beam radiation is generated with the use of an electron beam source chamber (e.g., by an electron beam tube). A suitable low power electron beam generating apparatus is made by American International Technologies (AIT) of Torrance, Calif. and designated as the MIN-EB™ CBT-101 model fitted with a ST-01-5050 model electron beam tube which requires minimal radiation shielding. See U.S. Reissue No. 35,203, incorporated herein by reference. Suitable radiation shielding materials include, but are not limited to, leaded acrylic, lead oxide epoxy, lead, other metals and leaded glass such as those available from Nuclear Associates of New York.

As stated before, inks containing certain pigments are difficult to cure using only UV radiation, and may also be difficult to cure using both UV and visible light curing. Additionally, the thickness of the ink layers must be kept thin using these conventional curing techniques. The current invention, however, allows deep curing of ink. It is now possible to, for example, apply several layers of ink on a ball. This may be desirable for, for example, a multicolor logo. The use of electron beam curing allows for thicker layers of ink. The plurality of ink layers can subsequently be fully cured by exposure to the electron beam.

In another embodiment, the plurality of inks can be applied to a given surface, wherein the inks do not overlap.

The use of a low power electron beam source allows more efficient dosage of electrons and also helps prevent unwanted reactions with substrate components.

The electron beam tube is a vacuum tube having a base end and a window end. An extended filament is disposed within the beam tube proximate to the base end. The filament generates electrons in conjunction with electron beam forming electrodes. The electrons from the filament (i.e., electron beam source) are directed toward and through the beam window of the electron beam tube. A low power electron beam tube is preferred. The beam energy from a low power beam tube is below about 125 kV (kilovolts), typically between about 15–80 kV (or any value therebetween), more typically between about 20–75 kV and most typically between about 30–65 kV. The voltage to the power supply (input voltage from about 10 to about 1,000 volts) is preferably about 110 volts (or less) and its operating power is preferably about 100 watts (or less). However, the output voltage of the beam tube may be between 20–100 kV or any value therebetween. Likewise, the operating power of the electron beam may be from about 10–1,000 watts or any value therebetween.

The window of the low power beam tube should be sufficiently transparent to the low power electron beam to transmit sufficient energy to cure the logo ink or the production ink of the present invention. For example, the window should be sufficiently transparent to permit passage of sufficient E-beam energy to cure a layer of a logo ink or a production ink on a golf ball or game ball.

The electron beam filament is displaced at a first distance from the beam window within the electron beam tube. The first distance is from about 0.01 to about 15 centimeters or any value therebetween, typically, from about 1.0 to about 12 centimeters (cm) and, more typically, from about 1.5 to about 4 centimeters. The electron beam window in a low power beam tube is typically made of a thin (e.g., about 1–10 microns or any value therebetween; preferably about 2.5 microns), low Z material such as carbide, nitride, or doped silicon (e.g., boron nitride, silicon carbide, silicon nitride, boron carbide, boron nitride hydride, boron doped silicon, and titanium foil), or mixtures thereof. Preferably, the beam window has dimensions of about 2×25 mm.

The logo ink layer or the production ink layer is maintained at a second distance from the beam window. The second distance is typically from about 1 mm to about 15 centimeters or any value therebetween, more typically between about 0.5 cm to about 5 cm and most typically between about 1.0 to about 2.0 centimeters. For suitable cure, as the second distance is increased, the operating power is also increased and vice versa. Further, if logo ink or production ink is to be cured, for example at multiple locations on a golf ball, the ball is rotated, preferably fully rotated, during EB irradiation and cure. The rotation rate should be sufficient to irradiate and cure any ink logos or production prints on the golf ball, game ball, or the like as they pass the electron beam tube curing station on the assembly line.

Without being bound by theory, it is believed that curing using electron beam radiation is inhibited by oxygen. Thus, the use of electron beam radiation curing requires that the material to be cured be surrounded by a gas, for example, an inert gas (e.g., argon, helium) or nitrogen, or mixtures thereof during irradiation and cure. The method of the present invention initially cures the surface of the ink using UV radiation, and, therefore, eliminates the need for the use of an inert atmosphere. The method of the present invention thus eliminates problems associated with uncured ink due to oxygen inhibition, and is more cost-effective than standard electron beam curing applications due to there being no requirement to provide an inert atmosphere for curing.

In one embodiment of the invention the cooling gas is air. While in many instances it is preferred to use the UV, visible, or UV/visible curing step before the electron beam curing step, the use of the electron beam curing step before the UV, visible, or UV/visible curing step is also envisioned.

During electron beam curing, the electron beam causes the beam window temperature to rise. Thus, the beam window is preferably exposed to at least one of these gases at a flow rate sufficient to prevent cracking, breaking, overheating, melting or otherwise damaging the beam window (i.e., maintaining the integrity of the beam window). Typically, the gas flow over the window prevents rapid temperature increases (i.e., overheating) of the beam window. The gas flow rate should be sufficient to maintain the transparency and the integrity of the window. For example, nitrogen gas at a flow rate from about 0.5 to about 30 cubic feet per minute (CFM) or more is sufficient to maintain the integrity of the beam window during curing. Further, the irradiation time (i.e., residence time) is about 10 seconds or less, typically from about 0.1 seconds to about 10 seconds or any value therebetween. Preferably, the residence time is from about 300 millisecond (ms) to about 3 seconds and most preferably from about 500 ms - 1.5 seconds. It is preferred to use a minimum residence time to maximize production.

Further, it is preferred that the electron beam have a beam width suitable to expose the ink surface to be cured. Preferably, the cure speed achievable with electron beam radiation is in the order of about 200 ft/second or less. The electron beam irradiation and curing may be accomplished with an array of electron beam tubes or with a single electron beam tube.

Having described the invention, the following example is provided to illustrate specific applications thereof, including the best mode now known to perform the invention. The specific example is not intended to limit the scope of the invention described herein.

EXAMPLES

Production inks were pad printed onto SURLYN® covered golf ball covers to form production prints. Thereafter, the ink was UV radiation cured with a Fusion Model 300 UV source using a "D bulb" having a peak power at about 300 watts. The "D bulb" is provided by Fusion Systems Corp. While the "D bulb" is preferred, Fusion Systems'"H bulb" or the "V bulb" may be used or a combination thereof. Each of these bulbs is a mercury UV irradiating bulb. The residence time for curing was from about 0.25 second to about 1.25 seconds and the distance from the bulb to the production ink layer was about 1 inch to about 5 inches. During UV curing of the production inks, air was fed over the golf ball to keep the lamp, ball, and ink surfaces cool.

A second ball was cured with electron beam radiation for a residence time of about 1 second to about 3 seconds with an AIT Min-EB™-CBT-101 model modified electron beam processor operating at 200 microamps and 50 watts power, an input voltage of about 110 volts to the power supply, 30–75 kV operating beam voltage, a first distance of 4–8 inches, a second distance of about 1–3 cm, a ball (e.g., golf ball having a diameter of about 1.7 inches), an electron beam width of about 1 inch, a 2×25 mm beam window of 2.5 micron thickness made of Sinocil™ and ball cooling with about 0.5–30 cubic feet per minute (CFM) of air. The Min-EB™-CBT-101 was modified to accept a golf ball such that the second distance was maintained about 1.5 centimeters (cm). The Min-EB™-CBT-101 was fitted with a Model ST-01-5050 electron beam bulb (i.e., electron beam tube) from AIT.

A third ball was initially irradiated with UV radiation, and subsequently with electron beam irradiation, both steps being as described above.

For a production ink or a logo ink to have sufficient adhesion (e.g., for production ink-intercoat adhesion to a golf ball cover or primer coat and adhesion to a topcoat or overcoat after UV radiation curing; for logo ink—adhesion to topcoat after UV radiation curing) in accordance with the present invention, the production ink or logo ink should exhibit adhesion to at least about 75 percent of the inked surface after 200 repeated impacts with a club.

A test involves subjecting UV cured production inked and logo inked golf balls to a number (e.g., 100, 200, 500 etc.) of random collisions with a non-elastic surface (e.g., a grooved steel plate) at a high speed (e.g., about 90 miles per hour). Preferably, the speed of the non-elastic surface is at least about 90 miles per hour upon impact with the ball.

| Ink | Parts |
|---|---|
| Transtech UVA ink (black) | 100 |
| Isobornyl acrylate | 20 |
| Highlink OG 108 | 10 |
| DIDMA | 1 |
| HNU 470* | 0.05 |

*a visible light photoinitiator.

| Electron beam | |
|---|---|
| Process gas | Air |
| Exposure time | 2 sec. |
| Voltage | 65 KeV |
| Current | 0.5 mA |
| UV fusion lamp | |
| Belt speed | 9 ft/min. |
| UVA Dose | 2.2 J/cm$^2$ |
| Bulb type | D |
| Watt density | 1.2 w/cm$^2$ |

The ball cured using electron beam irradiation alone exhibited a surface which was tacky to the touch. MEK rubs removed the surface layer, but did not remove the lower layers. This suggests that surface curing of this ball was incomplete. The ball demonstrated good adhesion (200 hits), but uncured surface ink transferred readily to other balls upon handling.

The ball cured using UV curing did not through cure the ink. The surface was not tacky but the ink was easily removed with MEK rubs. The inks failed hit testing (200 hits) due to limited adhesion at the ink ball interface.

The ball cured using UV irradiation followed by electron beam irradiation demonstrated that the ink was through cured. Likewise, the ball cured with electron bean irradiation followed by UV irradiation was also through cured. The surface was not tacky and MEK rubs were not able to remove the ink. Hit testing showed no adhesion loss of the cured ink.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

What is claimed is:

1. A method for forming an inked image on a golf ball comprising the steps of:

placing at least one ink layer on at least a portion of the curved surface of a golf ball;

subjecting the at least one ink layer to a first irradiation thereupon in an amount sufficient to at least partially cure a portion thereof; and subjecting the at least one ink layer to a second irradiation thereupon in an amount sufficient to further cure the at least one ink layer, wherein the first irradiation comprises electron beam radiation, and wherein the second irradiation comprises ultraviolet radiation, visible radiation, or a combination thereof.

2. The method of claim 1, wherein the at least one ink layer comprises a visible light photoinitiator.

3. The method of claim 1, wherein the at least one ink layer comprises an ultraviolet light photoinitiator.

4. The method of claim 1, wherein the ball is exposed to air during said electron beam radiation.

5. The method of claim 1, further comprising the steps of:

placing a second ink layer on at least a portion of the golf ball; and curing the second ink layer.

6. The method of claim 1, further comprising the step of applying a top coat to the golf ball.

7. The method of claim 1, wherein the electron beam radiation is passed through a window formed of a material selected from the group consisting of carbide, nitride, boron doped silicon, and titanium foil.

8. The method of claim 1, wherein the at least one ink layer further comprises an adhesion promoting component.

9. The method of claim 1, wherein the at least one ink layer further comprises a toughening agent.

10. The method of claim 1, wherein the ink image is a logo or a production print.

11. The method of claim 1, wherein the electron beam radiation has a residence time of about 0.1 second to about 10 seconds.

12. A method for forming an inked image on a golf ball comprising the steps of:

placing at least one ink layer on at least a portion of the curved surface of a golf ball;

subjecting the at least one ink layer to a first irradiation thereupon in an amount sufficient to at least partially cure a portion thereof, and subjecting the at least one ink layer to a second irradiation thereupon in an amount sufficient to further cure the at least one ink layer, wherein the first irradiation comprises ultraviolet radiation, visible radiation, or a combination thereof, and wherein the second irradiation comprises electron beam radiation.

13. The method of claim 12, wherein the at least one ink layer comprises a visible light photoinitiator.

14. The method of claim 12, wherein the at least one ink layer comprises an ultraviolet light photoinitiator.

15. The method of claim 12, wherein the at least one ink layer further comprises an adhesion promoting component.

16. The method of claim 12, wherein the at least one ink layer further comprises a toughening agent.

17. The method of claim 12, wherein the ink image is a logo or a production print.

18. The method of claim 12, wherein the ball is exposed to air during said electron beam radiation.

19. A method for printing on a golf ball, comprising the steps of:

placing a first layer of radiation curable layer on at least a portion of the ball;

irradiating the first layer with visible light, ultraviolet light, or a combination thereof in an amount sufficient to partially cure the ink; and irradiating the first layer with an electron beam in an amount sufficient to further cure the ink.

20. The method of claim 19, further comprising the steps of:
placing a second layer of radiation curable ink on at least a portion of the ball; and
curing the second ink layer.

21. The method of claim 20, wherein the second ink layer at least partially overlays the first ink layer.

22. The method of claim 20, wherein the first and second layers comprise pigments which impart color, wherein the color of the first layer is different than the color of the second layer.

23. The method of claim 19, wherein the first layer comprises production ink.

24. The method of claim 19, wherein the first layer comprises logo ink.

25. The method of claim 19, wherein the first layer is placed on a portion of the ball that is coated with a top coat.

26. The method of claim 19, wherein the ball is exposed to air during said electron beam radiation.

27. The method of claim 19, wherein the golf ball is coated with a top coat after placing the first layer.

* * * * *